US009106929B2

United States Patent
Boyce et al.

(10) Patent No.: US 9,106,929 B2
(45) Date of Patent: Aug. 11, 2015

(54) OVERLAYS USING AUXILIARY PICTURES

(71) Applicant: VIDYO, INC., Hackensack, NJ (US)

(72) Inventors: Jill Boyce, Manalapan, NJ (US);
Stephan Wenger, Hillsborough, CA (US)

(73) Assignee: Vidyo, Inc., Hackensack, NJ (US)

( * ) Notice: Subject to any disclaimer, the term of this patent is extended or adjusted under 35 U.S.C. 154(b) by 0 days.

(21) Appl. No.: 14/588,569

(22) Filed: Jan. 2, 2015

(65) Prior Publication Data

US 2015/0195571 A1 Jul. 9, 2015

Related U.S. Application Data

(60) Provisional application No. 61/923,057, filed on Jan. 2, 2014.

(51) Int. Cl.
| | |
|---|---|
| *H04N 11/02* | (2006.01) |
| *H04N 19/597* | (2014.01) |
| *H04N 19/36* | (2014.01) |
| *H04N 19/70* | (2014.01) |
| *H04N 19/513* | (2014.01) |

(52) U.S. Cl.
CPC ............ *H04N 19/597* (2014.11); *H04N 19/36* (2014.11); *H04N 19/513* (2014.11); *H04N 19/70* (2014.11)

(58) Field of Classification Search
CPC ... H04N 19/597; H04N 19/36; H04N 19/513; H04N 19/70

USPC ....................... 375/240.02, 240.16
See application file for complete search history.

(56) References Cited

U.S. PATENT DOCUMENTS

| | | | |
|---|---|---|---|
| 2013/0034170 A1 | 2/2013 | Chen et al. | |
| 2013/0077679 A1 | 3/2013 | Wang et al. | |
| 2013/0077681 A1 | 3/2013 | Chen et al. | |
| 2013/0235152 A1 | 9/2013 | Hannuksela et al. | |
| 2013/0287093 A1* | 10/2013 | Hannuksela et al. | 375/240.02 |
| 2015/0135212 A1* | 5/2015 | Smolic et al. | 725/32 |

OTHER PUBLICATIONS

Stefanoski et al. "Proposal for Supporting Optional Overlays with MV-HEVC". JCTVC-O0358, Oct. 2013, pp. 1-6.*
International Search Report dated Mar. 26, 2015 in PCT/US15/10022.

* cited by examiner

*Primary Examiner* — Christopher S Kelley
*Assistant Examiner* — Zhihan Zhou
(74) *Attorney, Agent, or Firm* — Baker Botts, LLP

(57) ABSTRACT

The disclosed subject matter provides techniques for coding overlays in a scalable bitstream environment. H.265's Video Parameter Set (VPS) may be augmented to include syntax elements indicative of a type of an auxiliary picture, which can, for example, be an overlay picture, an overlay layout, an alpha picture (which controls semi-transparency of pictures), and so on. A Supplementary Enhancement Information (SEI-) message may be used to describe the overlay layout and associate the aux type layers.

24 Claims, 3 Drawing Sheets

OVERLAYS USING AUXILIARY PICTURES

FIELD

The disclosed subject matter relates to video coding techniques in layered codecs, where pictures in a second layer are used to indicate the need to overlay the content of a picture in a first layer with content taken from a picture of a third layer.

BACKGROUND

Video compression using scalable techniques in the sense used herein allows a digital video signal to be represented in the form of multiple layers and/or in multiple views for multiview environments such as stereoscopic view environments. Henceforth, the described are only multiple layers, with the understanding that with respect to the disclosed subject matter, multiple views can in many cases substitute for multiple layers. Scalable video coding techniques have been proposed and/or standardized since at least 1993.

ITU-T Rec. H.265, entitled High Efficiency Video Coding, version April 2013, (available from International Telecommunication Union (ITU), Place des Nations, 1211 Geneva 20, Switzerland, and incorporated herein by reference in its entirety), is referred herein as HEVC. HEVC may be enhanced by a scalable extension known as SHVC (see JCT-VC-O1008, available from http://phenix.it-sudparis.eu/jct/doc_end_user/current_document.php?id=8527, incorporated herein in its entirety.) SHVC, in contrast to HEVC. may include the feature of coding multiple spatial or SNR enhancement layers in addition to a base layer in one scalable bitstream. Other extensions to H.265 may cover the multiview case.

In SHVC, the layer functionality has, as of the time of this writing, focused on traditional use cases for scalability, such as support for a heterogeneous receiver/decoder population utilizing the same scalable bitstream, or error resilience.

JCT-VC-O0358, entitled "Proposal for Supporting Optional Overlays with MV-HEVC", available from http://phenix.it-sudparis.eu/jct/doc_end_user/current_document.php?id=8500 and incorporated herein by reference in its entirety, discloses certain techniques to enable overlays using the multiview extension known as MV-HEVC. These techniques can have certain limitations; for example, they are described as being limited to MV-HEVC, support only a single overlay picture, and require an overlay layout for each overlay picture (in contrast to allowing for a single overlay layout for multiple overlay pictures).

It would be advantageous if the aforementioned shortcomings could be avoided.

SUMMARY

The disclosed subject matter provides techniques for coding overlays in a scalable bitstream environment. H.265's Video Parameter Set (VPS) may be augmented to include syntax elements indicative of a type of an auxiliary picture, which can, for example, be an overlay picture, an overlay layout, an alpha picture (which controls semi-transparency of pictures), and so on. A Supplementary Enhancement Information (SEI-) message may be used to describe the overlay layout and associate the aux type layers.

U.S. patent application Ser. No. 13/303,539, filed Nov. 23, 2011 and entitled "Video Stream Presentation System and Protocol" by Levy et. al, discloses certain techniques for overlays, and is incorporated herein by reference in its entirety.

BRIEF DESCRIPTION OF THE DRAWINGS

Further features, the nature, and various advantages of the disclosed subject matter will be more apparent from the following detailed description and the accompanying drawings in which.

Figure 1:
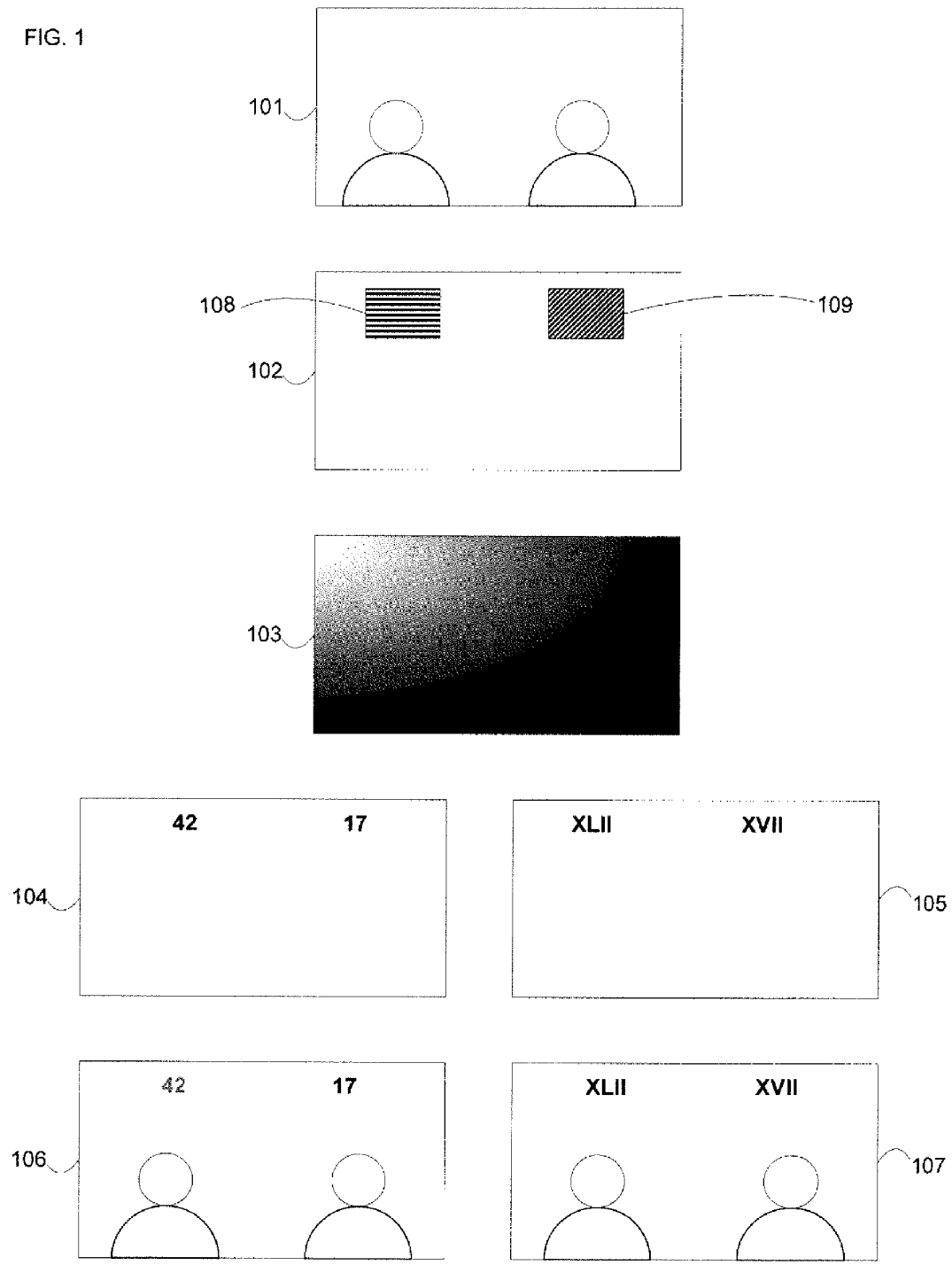
FIG. 1 is a schematic illustration of overlay in accordance with an exemplary embodiment of the disclosure.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

DETAILED DESCRIPTION

Throughout the description of the disclosed subject matter, the following terms are used:

Primary picture: a picture, coded in one or more layers using traditional layered coding tools, normally intended for display.

Auxiliary picture: a picture that is for auxiliary purposes. An Auxiliary picture may be coded in a scalable layer in the sense that it has a layer_id that is distinct from the layers used for the primary picture; however it is not used to represent the primary picture itself at a different resolution or SNR fidelity. Auxiliary pictures may be of different types. Multiple auxiliary pictures may be associated with the same primary picture. Auxiliary pictures may be scalably coded, using inter-layer prediction from other auxiliary picture layers of the same auxiliary picture type.

Overlay picture: A type of auxiliary picture that, after reconstruction, constitutes samples that may be overlaying the samples in the primary picture. An overlay picture may be scalably coded using inter-layer prediction from another overlay picture with a different value of layer id.

Overlay layout: An auxiliary picture that may indicate the presence of overlay samples from one or more overlay pictures at locations indicated by the overlay layout picture. An overlay layout picture may be scalably coded using inter-layer prediction from another overlay layout picture with a different value of layer id.

Overlay alpha: An alpha (transparency) map that indicates, on a per sample basis, the transparency of the overlay sample as selected and coded in overlay layout and overlay picture, respectively, and the primary picture. An overlay alpha picture may be scalably coded using inter-layer prediction from another overlay alpha picture with a different value of layer id.

An overview of the basic functionality of the disclosed subject matter is now described using an example.

FIG. 1 shows a primary picture (101), an overlay layout (102), an overlay alpha map (103), an "Arabic" overlay picture (104) (for users who prefer Arabic numerals), and a "Roman" overlay picture (105) (for users who prefer Roman numerals), and two composed final pictures ready for display (106) and (107). All those pictures are in the reconstructed (sample) domain. Assume that the final picture (106) is intended for Arabic numerals preferring audience, whereas the final picture (107) is intended for Roman numerals preferring audience. The example utilizes the disclosed subject matter to insert captions in Arabic and Roman numerals, into the final pictures (106, 107).

Final picture (106), in the example presented, can be generated for a user who wants to see Arabic numerals, but wants to use the semi-transparency feature of the alpha map. Accordingly, for the user of the final picture (106), control information as described later is generated that requires the use of both overlay layout (102), and alpha map (103), and maps both regions (108) and (109) of the overlay layout (102) to the overlay picture (104) that contains Arabic numerals. As a result, the final picture (106) contains overlay in Arabic numerals. The Arabic numeral 42 is depicted in greyshade so to reflect the white background of primary picture (101) and the approximately 50% transparency setting of the alpha map at the position of Arabic numeral 42 in the alpha map (103). Arabic numeral 17 in final picture (106), in contrast, is depicted in black, as the samples of the alpha map corresponding to the region (109) indicate opaqueness.

Final picture (107) has been created for a user preferring Roman numerals. Accordingly, regions (108) and (109) in the overlay layout (102) is mapped through control information described later to the overlay picture (105) that contains Roman numerals. The control information in this example indicates that no alpha map is being used. The resulting final picture (107) shows Roman numerals in the respective regions.

The creation of the final pictures (106, 107) may involve all aforementioned other pictures as follows. Note that many optimizations are possible. For example the decoding of those parts of the overlay pictures (104) and (105) which are not used for overlay can be skipped.

Figure 2:
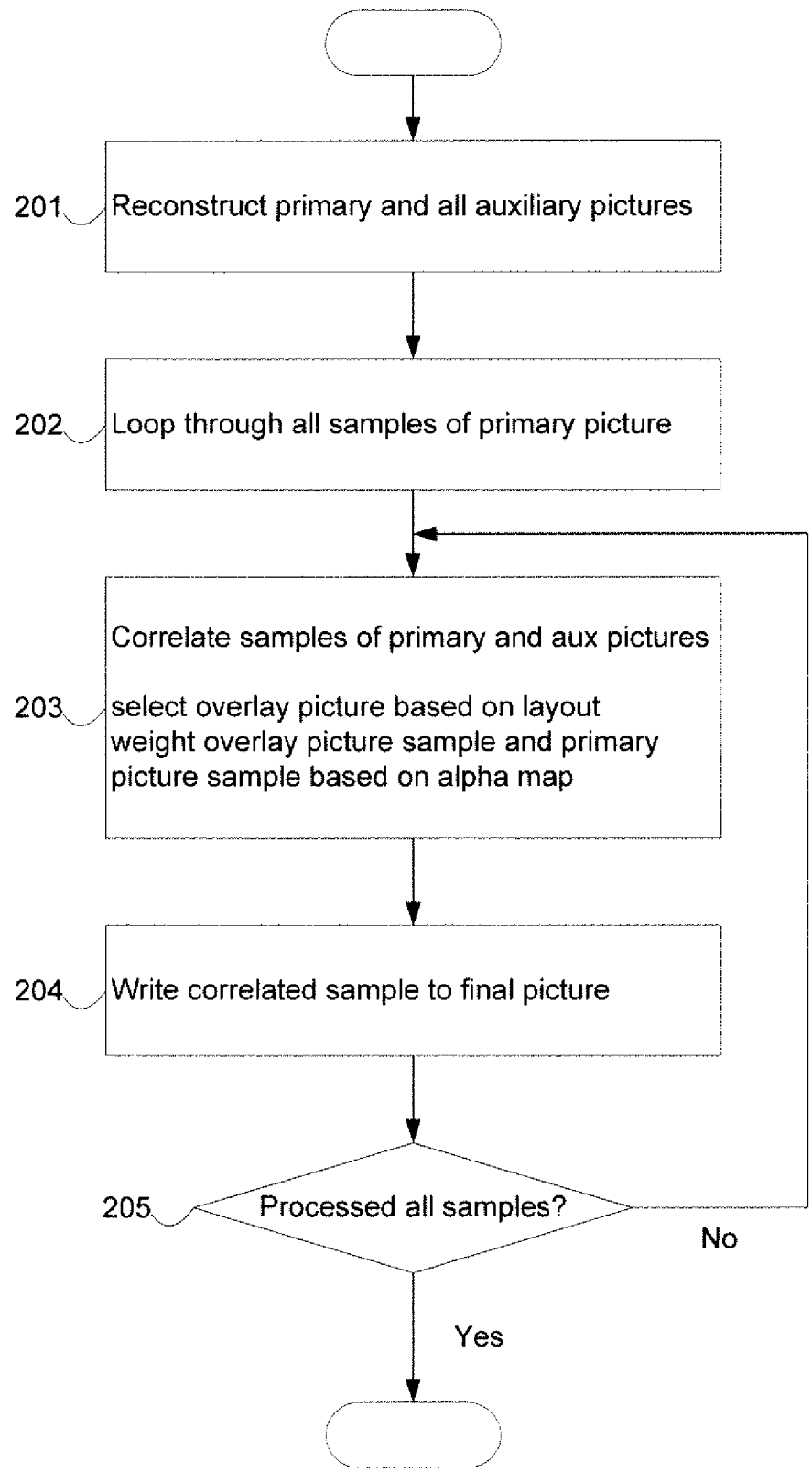
FIG. 2 is a flowchart of an exemplary implementation of overlay in accordance with an embodiment of the disclosure.

Referring to FIGS. 1 and 2, first, all the primary picture (101), the overlay layout (102), the overlay alpha map (103), and the overlay pictures (104, 105) are reconstructed (201) using normal video decoding/reconstruction techniques such as, for example, those described in H.265. Then, for all samples (202) in the primary picture (101), those samples of the primary picture indicated by certain values of spatially corresponding samples in the overlay layout (103) are correlated (203) with the spatially corresponding samples of the overlay picture (104, 105) selected by the sample value of the corresponding sample in the overlay layout (102) and other control information (not depicted). The correlation may involve the overlay alpha map (103) to indicate the transparency of the overlay picture (105, 106) with respect to the primary picture's (101) content. Third, the final pictures (106, 107) are created by replacing samples (204) of the primary picture (101) as indicated by the overlay layout (102) with the correlated samples generated in the previous step. This continues (205) until all samples of the primary picture (101) have been processed.

As for the spatial dimensions of any of the auxiliary pictures described herein, the description assumes that they have the same spatial dimensions as the primary picture. However, this should not be understood as a limitation of the disclosed subject matter. The techniques described herein could be extended to enable different spatial sizes of auxiliary picture and/or primary pictures. For example, it could be specified in a video decoding standard that, in a case where the sizes of an auxiliary picture and the primary picture do not match, the auxiliary picture is being scaled to the size of the primary picture using a specified filter. Alternatively, default behavior could be specified for such cases where a sample of an auxiliary picture is not available for a corresponding sample of a primary picture. A sample may be unavailable, for example, because it lies outside of the dimensions of the auxiliary picture as coded in its referred parameter sets, or outside of its cropping window, or similar. One choice for a default behavior could be that, in case of the overlay picture sample or an overlay layout sample being unavailable, the primary picture sample is being used in the correlation. In case of an unavailable alpha map sample, a sensible design choice could be that the overlay picture sample replaces the primary picture sample, which can also be the default behavior if no alpha map is present (which can be equal to the alpha map's horizontal and vertical dimensions are both 0).

An exemplary procedure is now described in more detail, including exemplary syntax and semantics for the indication of the presence and use of the described overlay technique.

The coded primary picture (or output layer set in case of multi-layered coding) can be reconstructed using a normal H.265 or SHVC decoding process. The reconstruction may involve multiple layers. This reconstruction may result in a reconstructed primary picture (101) of certain spatial dimensions as indicated in, for example, the parameter sets that can be included in the bitstream. The disclosed subject matter can operate with any form of reconstruction process, which could be as simple as copying uncompressed sample values or complex like the reconstruction process of H.265. The disclosed subject matter also can work with colorspace and/or sampling structures. For simplicity, described below is one case where the coded primary pictures are coded using H.265 in a single spatial/SNR layer (there could be temporal sub-layers, though).

The overlay layout (102) can be the result of the reconstruction of an auxiliary picture that is embedded in a bitstream that may (assuming SHVC syntax) be carried in a certain layer or layers of a scalable bitstream identified by a certain layer_id(s). It should be understood that the term "layer" in this context is not necessarily implying the use of mechanisms commonly associated with layered or scalable coding techniques (such as inter-layer prediction), but rather refers to a location and a signaling mechanism in the scalable bitstream. In H.265, auxiliary and primary coded pictures are organized in one or more slices, and a slice is encapsulated in a Network Abstraction Layer (NAL-) unit. The NAL unit includes a NAL unit header, and that NAL unit header includes a syntax element called layer_id. This syntax element can be used, for example, to identify slices belonging to an auxiliary picture.

The overlay layout may be reconstructed at the same decoding time as the primary picture with which it is associated, or it may have been reconstructed earlier. In other words, the frame rate of the layout (and, in fact, of other auxiliary pictures described in conjunction with the disclosed subject matter) can be the same, lower, or higher than the frame rate of the primary picture—though having a higher frame rate for auxiliary pictures than for primary pictures may not be sensible for the auxiliary picture types disclosed herein. The use of an overlay layout can be optional, and when no overlay layout is present, the overlay can be inferred to contain a single overlay region, containing all samples, and the content is taken from the first overlay picture. In other words, in the absence of an overlay layout but in the presence of at least one overlay picture, the first of these overlay pictures can be displayed in its entirety. The "first" overlay picture can be selected, for example, by reference to the lowest layer_id of all auxiliary pictures associated with the primary picture. Alternatively, an industry or other standard could specify that auxiliary pictures are to organized in an ordered list using an appropriate data structure, or there can be explicit control information, such as an SEI message described below.

The option of defaulting to a certain auxiliary picture can be useful, for example, in connection with an alpha map. Alternatively or in addition, the non-presence of an overlay picture could indicate that overlay is not in use, independent from the presence of the alpha map. The selection between the options can be made, for example, through a flag or flags that can be located, for example in the video parameter set or similar high level data structure.

The overlay layout (102) can contain one or more regions in which potentially different overlay pictures could be used. In an exemplary layout (102), shown are two regions, (108, 109). Region (108), indicated by horizontal hachures, can be coded with a certain sample value, for example 0x20. The second region (109), indicated by diagonal hachures, can be coded with a different sample value (0x40). As a reconstructed overlay layout is a reconstructed (albeit auxiliary) picture, it consists of sample values. Therefore, a designer is free to create regions of any shape or size that fits into the spatial area covered by the overlay layout and can be represented by samples. The regions do not necessarily have to be rectangular or of any other pre-determined shape, nor do they have to be continuous (several "islands" may belong to the same region. Further, in general, regions can also overlap in the sense that a certain sample may belong to more than one region; further details are provided below. Henceforth, these regions are also referred to as overlay elements, and so is the control information in an SEI message introduced later that refers to such a region/element.

Unless the primary picture is a black and white picture, it usually contains multiple sample planes utilized to represent color (such as, for example, a Y, Cr, Cb planes). The overlay layout, in contrast, may include a single sample plane that may indicate, through values of its samples, which overlay picture, or overlay picture element(s) to use for overlay. Alternatively or in addition, the overlay picture can be a color picture where only one of the planes is used, and the other planes may be ignored. This can be useful if the profile of the overlay pictures is a color profile such as H.265's main, main10, or scalable main profile. Insofar, the overlay techniques described herein bear no similarity to techniques known as "chroma keying" in the broadcast industry, except that only sample values, and not colors, may be used for the keying mechanism.

Assuming 8 bit samples for the overlay layout, up to 256 different overlay picture elements could theoretically be used. However, as the overlay layout (which includes the overlay elements) may be subject to lossy coding artifacts (as the layout may be coded using normal coding techniques available in, for example, H.265, and because the fidelity of an overlay layout is not directly visible to users and they should, therefore, be coded utilizing as few bits as possible—potentially yielding coding artifacts), in some cases it is prudent not to utilize a single sample value to indicate a given overlay picture, but rather allow for an interval of sample values for that purpose. This is described later in more detail.

The alpha map (103) can also be coded as an auxiliary picture using only one plane (even if more than one plane are available according to the auxiliary picture's profile. For example, with 8 bit sample values, 256 levels of transparency can be represented. A value of 0 in the alpha map can mean that the primary picture sample is used in the final picture(s). A value of 255 can mean that an overlay picture sample as indicated by control information (to be described later), the overlay layout, and the overlay picture, replaces the sample of the primary picture. Values between 0 and 255 can mean that a weighted average is created between the sample value of the primary picture and the overlay picture. For alpha maps, there may be no need to utilize intervals of sample values to indicate distinct levels of transparency, as small changes in transparency (as potentially introduced through lossy coding of the alpha map auxiliary picture) may hardly be visible to a user. Note that the term sample value (of the reconstructed primary coded picture) is given a broad interpretation herein, as for color pictures, a given sample may be represented by multiple sample values of multiple color planes, and for each of those a weighted average may need to be formed. Also, the term weighted average does not necessarily imply linear weighting. However, the linear or non-linear weighting scale should be well defined, for example by standardization or through explicit signaling.

The use of the alpha map can be dynamically switched on and off, for example through an SEI message. One possible signaling mechanism is described later in more detail.

The association of a sample value or values of the overlay layout and the respective overlay picture and/or overlay picture element can also be indicated in an SEI message.

In the following, described are details of the signaling of an overlay mechanism as disclosed above in the context of SHVC, followed by another example.

SHVC provides for layered coding, and other H.265-like technologies provide for multiview coding. In a scalable or multiview bitstream, it is not implicit which of the various decodable pictures in an access unit forms the primary picture as disclosed above. Accordingly, it may be required to explicitly indicate a primary picture layer, which may or may not be the highest (most complex) layer of the layer hierarchy of the scalable bitstream and also may not necessarily be the picture with the highest layer_id. One potential option is to associate the auxiliary pictures as disclosed above (as well as other auxiliary picture types available to those skilled in the art) with a primary picture layer through the ScalabilityId dimension values (as known from SHVC) of the overlay content layer. Other association mechanisms may be possible as well but may require additional signaling support.

For example, when primary pictures are scalably coded, e.g. using different values of the ScalabilityId dimensions, multiple primary pictures in different layers can exist, and auxiliary pictures can be associated with each primary picture layer. The auxiliary pictures can be scalable coded as well, by indicating direct dependency of the auxiliary picture layer on a different auxiliary picture layer. For example, in a two layer spatial scalability case, the two primary picture layers are a base layer with DependencyId=0, AuxId=0, and an enhancement layer with DependencyId=1, AuxId=0. An auxiliary picture layer with DepencencyId=0 and AuxId=1 is associated with the base layer, and another auxiliary picture layer with DependencyId=1 and AuxId=1 is associated with the enhancement layer. In the VPS extension, it can be signaled using the direct dependency flag that the auxiliary picture layer with DependencyId=1 and AuxId=1 is directly dependent on the auxiliary picture layer with DependencyId=0 and AuxId=1.

As the disclosed subject matter may require different types of auxiliary pictures, there can be a need to indicate the auxiliary picture type. H.265 and SHVC contain the concept of the Video Parameter Set (VPS), a data structure that can be used to describe layers and their relations. As the auxiliary pictures may be collected in their own layers, the VPS can be the appropriate data structure in an SHVC bitstream to include a syntax element that indicates the auxiliary picture type.

In an embodiment, the auxiliary picture type is explicitly signaled in an aux_type syntax element in the SHVC VPS-extension. This is shown below using the format of syntax and semantics definitions of H.265, which are well known to those skilled in the art.

```
vps_extension( )
...
    for( i = 1; i < NumAuxLayers; i++ )
        aux_type[ i ]                           u(8)
    }
...
```

```
NumViews = 1
NumAuxLayers = 0
for( i = 0; i <= MaxLayersMinus1; i++ ) {
    lId = layer_id_in_nuh[ i ]
    for( smIdx= 0, j = 0; smIdx < 16; smIdx++ )
        if( scalability_mask_flag[ smIdx ] )
            ScalabilityId[ i ][ smIdx ] = dimension_id[ i ][ j++ ]
    ViewOrderIdx[ lId ] = ScalabilityId[ i ][ 1 ]
    if( i > 0 && ( ViewOrderIdx[ lId ] != ScalabilityId[ i − 1 ][ 1 ] ) )
        NumViews++
    ViewScalExtLayerFlag[ lId ] = ( ViewOrderIdx[ lId ] > 0 )
    AuxId[ lId ] = ScalabilityId[ i ][ 3 ]
    if( i > 0 && ( AuxId[ lId ] != ScalabilityId[ i − 1 ][ 3 ] ) )
        NumAuxLayers++
}
``` aux_type[i] specifies the auxiliary picture type of the layer with AuxId[nuh_layer_id] equal to i. aux_type[i] shall be in the range of 0 to 4, inclusive, or 128 to 143, inclusive, for bitstreams conforming to this version of this Specification. Although the value of aux_type[i] shall be in the range of 0 to 4, inclusive, or 128 to 143, inclusive, in this version of this Specification, decoders shall allow values of aux_type[i] in the range of 0 to 255, inclusive.

It should be understood that the additional signaling overhead is small, and the overhead is located in the VPS extension, and, therefore, not affecting the coding efficiency of HEVC version 1 bitstreams. For example, if 3 auxiliary picture types were used to describe a single overlay, an additional 24 bits in the VPS may be required. In other words, the overhead introduced for support of the disclosed subject matter can be negligible.

Other explicit or implicit mechanisms for signaling the auxiliary picture type may also be possible. For example, the auxiliary picture type may be hard coded to the AuxId in the sense that a table could be specified (in a standard or by vendor agreement) that binds a certain AuxId with a certain auxiliary picture type.

The various auxiliary picture types used in conjunction with the disclosed subject matter need to be defined. As a side effect of the example presented below, other auxiliary picture types, that may be required to support other, potentially non-overlay related used cases, could be added using the same signaling mechanism.

TABLE I

| aux_type[ i ] | Name of aux_type[ i ] | Type of auxiliary pictures |
|---|---|---|
| 0 | AUX_ALPHA | Alpha plane of non-auxiliary picture |
| 1 | AUX_DEPTH | Depth picture |
| 2 | AUX_OVERLAY_CONTENT | Overlay content picture |
| 3 | AUX_LAYOUT | Layout of auxiliary overlay picture |
| 4 | AUX_OVERLAY_ALPHA | Alpha plane of auxiliary overlay picture |
| 5-127 | | Reserved |
| 128-143 | | Unspecified |
| 144-255 | | Reserved |

The aforementioned mechanisms and syntax construction, or mechanisms fulfilling a similar purpose (such as binding the auxiliary picture type to an AuxID value through standardization or vendor agreement) can allow including the auxiliary pictures necessary or helpful for the support of the disclosed subject matter into an SHVC scalable bitstream, together with the primary coded pictures. However, some mechanisms may still be missing to enable the full functionality of the overlay as described earlier. For example, using only the syntax described so far, there is no mapping between sample values of the overlay layout and the (potentially more than one) overlay pictures. Also, temporal aspects and persistence of overlay information has not yet been described.

H.265, as some other video coding standards, contains the concept of a Supplementary Enhancement Information (SEI) message. An SEI message can be characterized as being part of the bitstream and synchronous with the picture decoding, but not required by the decoding process. In other words, SEI messages can be appropriate to convey time-critical information. Further, the use of SEI message content in a decoding system is optional, in the sense that if a decoding system is not using them, the decoding of non-SEI message content is not affected, although the user experience can be bad when ignoring SEI messages.

SEI messages or comparable mechanisms can be appropriate for overlay control information that may change from picture to picture. When using a picture-synchronous mechanism, an encoder or media sender can control when and how auxiliary pictures are being used; including, for example, when and for how long an overlay is being shown, and at what level of transparency. This can enable functionalities such as multi-lingual close captioning, potentially including graphical information, rather than being limited to black/white, single font, experiences as common in television at the time of writing. SEI messages can also fit within SHVC in that both overlay pictures and their control information are classified for optional use by the decoder. However, the disclosed subject matter is not limited to the use of SEI messages to convey this and other information. For example overlay control information could also be placed in a picture header, slice header, or in a parameter set (including its visual usability information (VUI) section) activated for this purpose. When henceforth an overlay information SEI message is being discussed, those choices are meant to be included.

The overlay information SEI message can define associations between the auxiliary pictures or auxiliary picture layers used for defining an overlay. It can also describe the contents of the overlay layout, and how regions of the picture are divided into individually controllable overlay elements. If multiple layer sets are possible, it can also define to which layer set an auxiliary picture layer belongs.

In H.265 and SHVC, SEI messages can have a defined persistence scope. The persistence scope of the overlay info SEI can be defined as follows:

TABLE II

| SEI message | Persistence scope |
|---|---|
| ... | ... |
| Overlay info | Specified by the syntax of the SEI message |

The syntax and semantics of the SEI related to the persistence scope can be such that one or more syntax elements can restrict the scope of the SEI message to certain access units in the bitstream. Further, when a persistence scope has previously been selected covering more than one access unit, a cancellation mechanism can be included that disables the overlay by voiding the contents of the previously received SEI message.

An overlay_info SEI message syntax can be defined as follows:

```
overlay_info( ) {
   overlay_info_cancel_flag                              u(1)
   if (!overlay_info_cancel_flag) {
      num_overlays_minus1                                ue(v)
      overlay_info_name_len                              ue(v)
      for( i = 0; i < num_overlays_minus1; i++ ) {
         overlay_idx[ i ]                                ue(v)
         overlay_name[ i ]                               f(v)
         overlay_content_layer_id[ i ]                   u(6)
         overlay_layout_present_flag[ i ]                u(1)
         if (overlay_layout_present_flag[ i ]) {
            overlay_layout_layer_id[ i ]                 u(6)
            overlay_layout_persistence_flag[ i ]         u(1)
         }
         overlay_alpha_present_flag[ i ]                 u(1)
         if (overlay_alpha_present_flag[ i ])
            overlay_alpha_layer_id[ i ]                  u(6)
            overlay_alpha_persistence_flag[ i ]          u(1)
         }
      }
      if (overlay_layout_present_flag[ i ]) {
         num_overlay_elements_minus1[ i ]                ue(v)
         for( j = 0; j <=
          num_overlay_elements_minus1[ i ]; j++ ) {
            overlay_element_idx[ i ][ j ]                ue(v)
            overlay_element_name[ i ][ j ]               f(v)
            overlay_element_layout_min[ i ][ j ]         u(v)
            overlay_element_layout_max[ i ][ j ]         u(v)
         }
      }
      overlay_info_persistence_flag                      u(1)
   }
}
```

The overlay_info SEI message semantics can be defined as follows:

overlay_info_cancel_flag 1 indicates that the SEI message cancels the persistence of any previous overlay info SEI message in output order. overlay_info_cancel_flag equal to 0 indicates that overlay info follows.

num_overlays_minus1 specifies the number of overlays described. num_overlays_minus1 shall be in the range of 0 to 15.

overlay_info_name_length specifies the length in characters of the overlay_element_name[i][j] syntax element. overlay_info_name_length shall be in the range of 0 to 256.

overlay_idx[i] indicates the index of the i-th overlay. overlay_idx[i] shall be in the range of 0 to 255.

overlay_name[i] indicates the name label of the i-th overlay. The length of the syntax element overlay_name[i] in characters is given by overlay_info_name_length.

overlay_content_layer_id[i] indicates the nuh_layer_id value of the NAL units of the overlay contents of the i-th overlay. aux_type[AuxId[overlay_content_layer_id[i]]] shall be equal to AUX_OVERLAY_CONTENT.

The i-th overlay is associated with the primary picture layer with nuh_layer_id equal to PLid, for which
   ViewOrderIdx[PLid]=ViewOrderIdx[overlay_content_layer_id[i]]
   DependencyId[PLid]=DependencyId[overlay_content_layer_id[i]]
   AuxId[PLid]=0 overlay_layout_present_flag[i] equal to 1 specifies that overlay_layout_layer_id[i] is present. overlay_layout_present_flag[i] equal to 0 specifies that overlay_layout_layer_id[i] is not present.

overlay_layout_layer_id[i] indicates the nuh_layer_id value of NAL units in the overlay layout of the i-th overlay. aux_type[AuxId[overlay_layout_layer_id[i]]] shall be equal to AUX_OVERLAY_LAYOUT.

overlay_layout_persistence_flag[i] equal to 0 indicates that an access unit which does not contain a picture with nuh_layer_id equal to overlay_layout_layer_id[i] shall generate a decoded picture with nuh_layer_id overlay_layout_layer_id[i] in which all sample values are set equal to 0.

overlay_layout_persistence_flag[i] equal to 1 indicates that the overlay layout output picture persists in output order until one or more of the following conditions are true:
   A new CVS begins.
   The bitstream ends.
   A picture in an access unit with nuh_layer_id equal to overlay_layout_layer_id[i] is output having PicOrderCntVal greater than PicOrderCnt(CurrPic).

overlay_alpha_present_flag[i] equal to 1 specifies that overlay_alpha_layer_id[i] is present. overlay_alpha_present_flag[i] equal to 0 specifies that overlay_alpha_layer_id[i] is not present.

overlay_alpha_layer_id[i] indicates the nuh_layer_id value of NAL units in the overlay alpha of the i-th overlay. aux_type[AuxId[overlay_alpha_layer_id[i]]] shall be equal to AUX_OVERLAY_ALPHA.

overlay_alpha_persistence_flag[i] equal to 0 indicates that an access unit which does not contain a picture with nuh_layer_id equal to overlay_alpha_layer_id[i] shall generate a decoded picture with nuh_layer_id_overlay_alpha_layer_id[i] in which all sample values are set equal to $1<<BitDepthY-1$.

overlay_alpha_persistence_flag[i] equal to 1 indicates that the overlay alpha output picture persists in output order until one or more of the following conditions are true:
   A new CVS begins.
   The bitstream ends.
   A picture in an access unit with nuh_layer_id equal to overlay_alpha_layer_id[i] is output having PicOrderCntVal greater than PicOrderCnt(CurrPic).

num_overlay_elements_minus1[i] indicates the number of overlay elements in the i-th overlay.

overlay_element_idx[i][j] indicates the index of the j-th overlay element of the i-th overlay. overlay_element_idx[i][j] shall be in the range of 0 to 255.

overlay_element_name[i][j] indicates the name label of the j-th overlay element of the i-th overlay. The length of the syntax element overlay_element_name[i][j] is overlay_info_name_length characters.

overlay_element_layout_min[i][j] and overlay_element_layout_max[i][j] indicate the minimum and maximum values, respectively, of range of sample values corresponding to the j-th overlay element of the i-th overlay. The length of the overlay_element_layout_min[i][j] and overlay_element_layout_max[i][j] is $BitDepth_Y$ bits.

The value of variable OverElement[i][x][y], the overlay element index of the (x, y) sample position of the i-th overlay, is derived as follows, where $sample_{LAYOUT}[x][y]$ refers to the (x, y) sample position of the decoded layout auxiliary picture of the i-th overlay:

```
for( y=0; y < pic_height_in_luma_samples; y++ ) {
    for( x=0; x < pic_width_in_luma_samples; x++ ) {
        for (i =0; i <= number_overlays_minus1[ i ]) {
            OverlayElement[i][x][y] = 0
            for (j = 0; j <= num_overlay_elements_minus1[ i ]; j++ )
            {
                if (sample_LAYOUT [x][y] >=
                    overlay_element_layout_min[ i ][ j ]
                        && sample_LAYOUT[x][y] <=
                overlay_element_layout_max[ i ][ j ])
                    OverlayElement[i][x][y] = overlay_element_idx[ i ][
                        j ]
            }
        }
    }
}
``` overlay_info_persistence_flag specifies the persistence of the overlay info SEI message. overlay_info_persistence_flag equal to 0 specifies that the overlay info SEI message applies to the current decoded picture only.
overlay_info_persistence_flag equal to 1 specifies that the overlay info SEI message persists in output order until one or more of the following conditions are true:
  A new CVS begins.
  The bitstream ends.
  A picture in an access unit containing a overlay info SEI message is output having PicOrderCntVal greater than PicOrderCnt(CurrPic).

The use of the SEI message above shall be described using the example of FIG. 1. Other uses, such as scalably coded primary or auxiliary pictures, that are known to those skilled in the art are also within the scope of the disclosed subject matter.

The scalable bitstream can include layers as follows:

TABLE III

| Layer_id | Includes | Type |
|---|---|---|
| 0 | Primary coded picture layer | coded picture based on 4:2:0 YCbCr samples |
| 128 | Overlay layout layer | coded picture, single plane |
| 129 | Arabic digits overlay content layer | coded picture based on 4:2:0 YCbCr samples |
| 130 | Roman digits overlay content layer | coded picture based on 4:2:0 YCbCr samples |
| 131 | Alpha map | coded picture, single plane |

In the example, the primary coded picture is coded in a single layer with layer_id=0, and uses YCbCr colorspace with a 4:2:0 sample structure, which is a format that can be specified in a profile like a scalable main profile.

The overlay layout layer has a layer_id=128.

The overlay SEI message shown below can be included in the bitstream to represent overlays that, once rendered, results displayed pictures (106) and (107). The table below shows the SEI message syntax populated with values creates displayed pictures (106) and (107).

The populated SEI message is described with reference to the line numbers which are leftmost in the table.

TABLE IV

| 0 | overlay_info( ) { | |
|---|---|---|
| 1 | overlay_info_cancel_flag | 0 |
| 2 | if (!overlay_info_cancel_flag) { | |
| 3 | num_overlays_minus1 | 1 |
| 4 | overlay_info_name_len | 0 |
| 5 | for( i = 0; i < num_overlays_minus1; i++ ) { // loop unrolled below | |
| 6 | // i == 0 | |
| 7 | overlay_idx[ 0 ] | 0 |
| 8 | overlay_name[ 0 ] | "" |
| 9 | overlay_content_layer_id[ 0 ] | 129 |
| 10 | overlay_layout_present_flag[ 0 ] | 1 |
| 11 | if (overlay_layout_present_flag[ 0 ]) { | |
| 12 | overlay_layout_layer_id[ 0] | 128 |
| 13 | overlay_layout_persistence_flag[ 0 ] | 1 |
| 14 | } | |
| 15 | overlay_alpha_present_flag[ 0] | 1 |
| 16 | if (overlay_alpha_present_flag[ 0 ]) | |
| 17 | overlay_alpha_layer_id[ 0 ] | 131 |
| 18 | overlay_alpha_persistence_flag[ 0 ] | 1 |
| 19 | } | |
| 20 | // i == 1 | |
| 21 | overlay_idx[ 1 ] | 1 |
| 22 | overlay_name[ 1 ] | "" |
| 23 | overlay_content_layer_id[ 1 ] | 130 |
| 24 | overlay_layout_present_flag[ 1 ] | 1 |
| 25 | if (overlay_layout_present_flag[ 1 ]) { | |
| 26 | overlay_layout_layer_id[ 1 ] | 128 |
| 27 | overlay_layout_persistence_flag[ 1 ] | 1 |
| 28 | } | |
| 29 | overlay_alpha_present_flag[ 1 ] | 0 |
| 30 | if (overlay_alpha_present_flag[ 1 ]) | |
| 31 | overlay_alpha_layer_id[ 1 ] | n/a |
| 32 | overlay_alpha_persistence_flag[ 1 ] | n/a |
| 33 | } | |
| 34 | } | |
| 35 | // i== 0 | |
| 36 | if (overlay_layout_present_flag[ 0 ]) { | |
| 37 | num_overlay_elements_minus1[ 0 ] | 1 |
| 38 | for( j = 0; j <= num_overlay_elements_minus1[ 0 ]; j++) { | |

TABLE IV-continued

```
39      // i == 0, j == 0
40          overlay_element_idx[ 0 ][ 0 ]                              0
41          overlay_element_name[ 0 ][ 0 ]                             ""
42          overlay_element_layout_min[ 0 ][ 0 ]                       0x00
43          overlay_element_layout_max[ 0 ][ 0 ]                       0x2f
44      }
45      for( j = 0; j <= num_overlay_elements_minus1[ 0 ]; j++ ) {
46      // i == 0; j == 1
47          overlay_element_idx[ 0 ][ 1 ]                              0
48          overlay_element_name[ 0 ][ 1 ]                             ""
49          overlay_element_layout_min[ 0 ][ 1 ]                       0x30
50          overlay_element_layout_max[ 0 ][ 1 ]                       0x4f
51      }
52   }
53      for( j = 0; j <= num_overlay_elements_minus1[ 1 ]; j++ ) {
54      // i == 1; j == 0
55          overlay_element_idx[ i ][ j ]                              0
56          overlay_element_name[ i ][ j ]                             ""
57          overlay_element_layout_min[ i ][ j ]                       0x00
58          overlay_element_layout_max[ i ][ j ]                       0x2f
59      }
60      for( j = 0; j <= num_overlay_elements_minus1[ 1 ]; j++ ) {
61      // i == 1; j == 1
62          overlay_element_idx[ i ][ j ]                              0
63          overlay_element_name[ i ][ j ]                             ""
64          overlay_element_layout_min[ i ][ j ]                       0x30
65          overlay_element_layout_max[ i ][ j ]                       0x4f
66      }
67   }
68   overlay_info_persistence_flag                                     1
69  }
70 }
```

The SEI message includes two overlays, and therefore num_overlay_minus1 is equal to 1 (line 3). The SEI message contains a loop using an index i over these two overlays (line 5). The loop in shown as unrolled. For index i==0 (first overlay, resulting in displayed picture (106)), the overlay information is in lines 7-19 and 39-52. For index i==1 (second overlay, resulting in displayed picture (107)), the respective line numbers are 20-33 and 53-66.

The overlay information comprises the following items:

Lines 7 and 21, overlay_idx, can be a user-defined number that can help a renderer implementation. In the example presented, it does not have a functionality.

Line 8 and 22, overlay_name, can be a user-defined string, again to aid a renderer. As overlay_idx, it does not have a functionality beyond being a human-readable label.

Line 9 and 23, overlay_content_layer_id, can be the layer_id of the overlay content. This is the layer_id of the auxiliary picture that includes the (coded) sample values that represent the arabic or roman numerals, (104) and (105) respectively.

Line 10 and 24, overlay_layout_present_flag is a flag that indicates whether a layout is being used. In the example, both displayed picture (106) and (107) require the use of a layout and, therefore, the flag is set to 1.

Line 12 and 26: the syntax element overlay_layout_layer_id is present here, as the overlay_layout_present_flag is set to 1 (see above). Included here is the layer_id of the layout layer. As the layout (102) is the same for both displayed pictures (106, 107), it is possible to use the same layer_id (and the same coded layout auxiliary picture). This saves bits. However, it is equally possible to use different layout layers and different layout auxiliary pictures. That can make sense, for example, of the regions in the layout are of different size or shape. For example, Roman numerals are generally longer than arabic ones to represent the same content, and, therefore, a designer may choose to reserve less space in the layout for arabic numerals than for roman ones.

Line 13 and 27: the overlay persistence flag is set herein to 1, indicating that the overlay is to be used potentially longer than during the display of the access unit that contains the SEI message.

Line 15 and 29: the overlay_alpha_present_flag is set for the first overlay (line 15 resulting in picture (106), and not set in the second overlay (line 29 resulting in picture (107). This designer choice means that for displayed picture (106) an alpha map is in use, and that the controlling syntax elements (lines 17 and 18) are present, whereas for displayed picture (107), the alpha mpa is not in use and the syntax elements (lines 31 and 32) are absent.

Following the more general overlay information described above, is the overlay element information. The overlay element information is organized in two nested loops; the outer loop is the aforementioned loop over overlays, with index i ranging from 0 to num_overlays_minus1+1. Described below is only the content for the first overlay with i==0, which can be found in lines 36 through 52).

Line 37: the num_overlay_elements_minus1 is the number of overlay elements is coded in the overlay. The syntax element and the element information described below are present only when a layout is in use.

Line 38, 45: the inner loop with index j runs over the number of overlay elements.

Each overlay element can contain

Line 39, 47: overlay_element_idx, a user selectable number, and

Line 40, 48: overlay_element_name, a user selectable overlay name. Both can be used as machine/user readable representations of the overlay element use or functionality, but do not affect the overlay mechanisms described here.

Lines 41-42 and 49-50: overlay_layout_min and overlay_layout_max describe a sample range. If the sample value found in the overlay_layout (108) is within the bounds set by overlay_layout_min and overlay_layout_max, then the respective overlay content sample is replacing (in case of no alpha map) or weighted in (in case of alpha map) the sample of the reconstructed primary coded picture. Using multiple elements allows to dynamically switch on or off individual overlay elements by including SEI messages like the one described here, to enable and disable individual overlay elements. As the SEI message can be very compact when compared to the coded auxiliary picture that includes the overlay layout, using the SEI message can improve coding efficiency relatively to coding a different overlay layout.

The methods for overlay, described above, can be implemented as computer software using computer-readable instructions and physically stored in computer-readable medium. The computer software can be encoded using any suitable computer languages. The software instructions can be executed on various types of computers. For example, FIG. 3 illustrates a computer system 300 suitable for implementing embodiments of the present disclosure.

Figure 3:
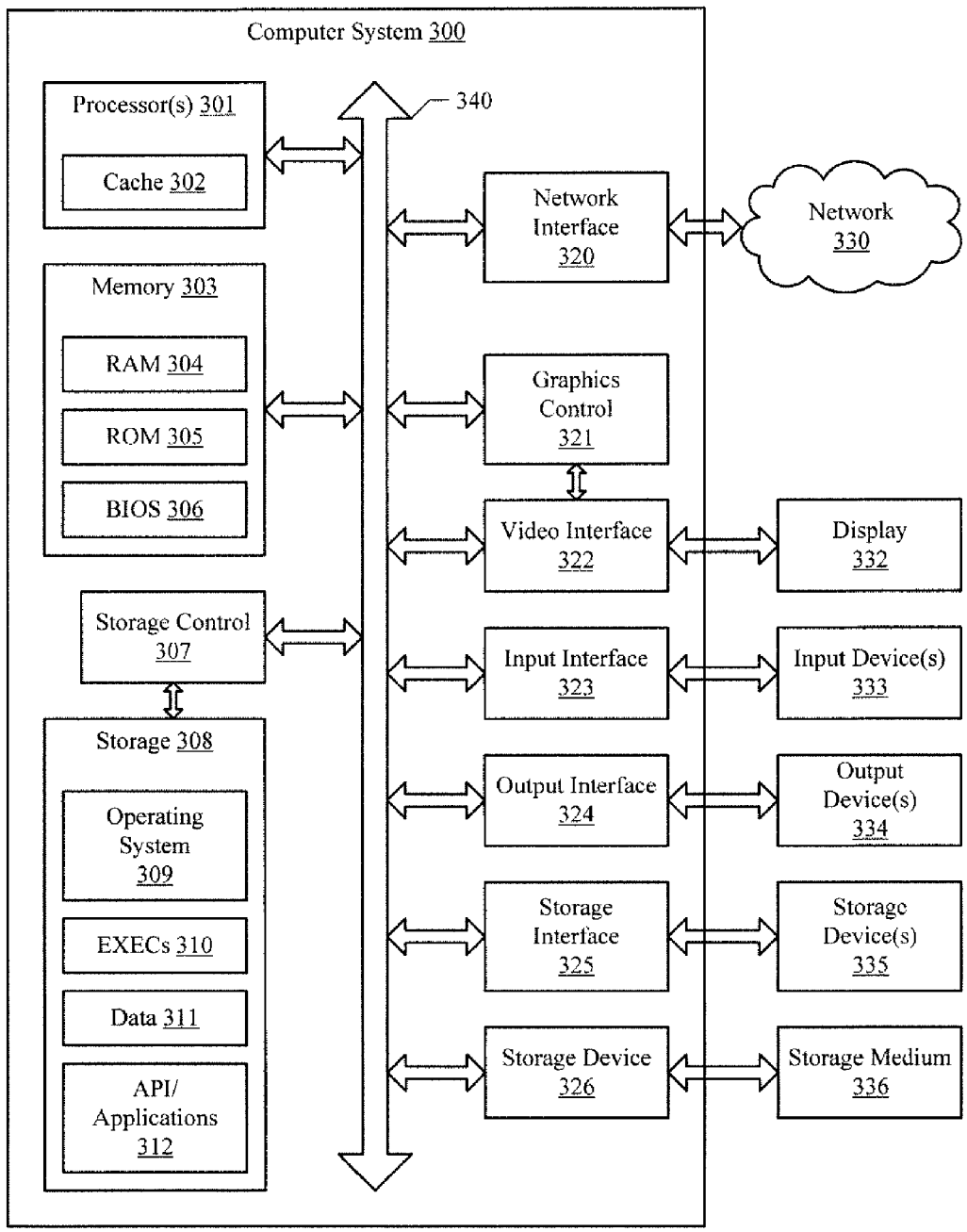
FIG. 3 shows an exemplary computer system in accordance with an exemplary embodiment of the present disclosure.

The components shown in FIG. 3 for computer system 300 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 300 can have many physical forms including an integrated circuit, a printed circuit board, a small handheld device (such as a mobile telephone or PDA), a personal computer or a super computer.

Computer system 300 includes a display 332, one or more input devices 333 (e.g., keypad, keyboard, mouse, stylus, etc.), one or more output devices 334 (e.g., speaker), one or more storage devices 335, various types of storage medium 336.

The system bus 340 link a wide variety of subsystems. As understood by those skilled in the art, a "bus" refers to a plurality of digital signal lines serving a common function. The system bus 340 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 301 (also referred to as central processing units, or CPUs) optionally contain a cache memory unit 302 for temporary local storage of instructions, data, or computer addresses. Processor(s) 301 are coupled to storage devices including memory 303. Memory 303 includes random access memory (RAM) 304 and read-only memory (ROM) 305. As is well known in the art, ROM 305 acts to transfer data and instructions uni-directionally to the processor(s) 301, and RAM 304 is used typically to transfer data and instructions in a bi-directional manner. Both of these types of memories can include any suitable of the computer-readable media described below.

A fixed storage 308 is also coupled bi-directionally to the processor(s) 301, optionally via a storage control unit 307. It provides additional data storage capacity and can also include any of the computer-readable media described below. Storage 308 can be used to store operating system 309, EXECs 310, application programs 312, data 311 and the like and is typically a secondary storage medium (such as a hard disk) that is slower than primary storage. It should be appreciated that the information retained within storage 308, can, in appropriate cases, be incorporated in standard fashion as virtual memory in memory 303.

Processor(s) 301 is also coupled to a variety of interfaces such as graphics control 321, video interface 322, input interface 323, output interface 324, storage interface 325, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 301 can be coupled to another computer or telecommunications network 330 using network interface 320. With such a network interface 320, it is contemplated that the CPU 301 might receive information from the network 330, or might output information to the network in the course of performing the above-described method. Furthermore, method embodiments of the present disclosure can execute solely upon CPU 301 or can execute over a network 330 such as the Internet in conjunction with a remote CPU 301 that shares a portion of the processing.

According to various embodiments, when in a network environment, i.e., when computer system 300 is connected to network 330, computer system 300 can communicate with other devices that are also connected to network 330. Communications can be sent to and from computer system 300 via network interface 320. For example, incoming communications, such as a request or a response from another device, in the form of one or more packets, can be received from network 330 at network interface 320 and stored in selected sections in memory 303 for processing. Outgoing communications, such as a request or a response to another device, again in the form of one or more packets, can also be stored in selected sections in memory 303 and sent out to network 330 at network interface 320. Processor(s) 301 can access these communication packets stored in memory 303 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 300 can provide functionality as a result of processor(s) 301 executing software embodied in one or more tangible, computer-readable media, such as memory 303. The software implementing various embodiments of the present disclosure can be stored in memory 303 and executed by processor(s) 301. A computer-readable medium can include one or more memory devices, according to particular needs. Memory 303 can read the software from one or more other computer-readable media, such as mass storage device(s) 335 or from one or more other sources via communication interface. The software can cause processor(s) 301 to execute particular processes or particular parts of particular processes described herein, including defining data structures stored in memory 303 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

We claim:

1. A method for video decoding in a decoder, comprising:
   receiving, in a decoding device, a Video Parameter Set (VPS) pertaining to at least one coded video sequence and including layer descriptions for at least one primary picture layer having a first layer_id, and at least a first associated auxiliary picture layer having a second layer_id and a second associated auxiliary picture layer having a third layer_id;
   receiving, in the decoding device, an access unit belonging to one of the at least one coded video sequence, the access unit including: a primary coded picture including at least one Network Abstraction Layer (NAL-) unit having the first layer_id, a first auxiliary coded picture including at least one NAL unit having the second layer_id, a second auxiliary coded picture including at least one NAL unit having the third layer_id, and an overlay_info SEI message; and
   decoding the primary coded picture;
   wherein the overlay_info SEI message includes:
   a flag overlay_info_persistence_flag that, when 0, indicates that the overlay_info SEI message applies only to the access unit;
   an integer num_overlays_minus1 coded in a variable length format indicative of the number of overlay descriptions contained in the SEI message; and
   num_overlays_minus1+1 overlay descriptions;
       wherein each overlay description includes:
       an integer overlay_idx coded in a variable length format;
       an integer overlay_content_layer_id coded in a fixed length format, indicative of a fourth layer id;
       a flag overlay_layout_present_flag that, when set, indicates the presence of an integer overlay_layout_layer_id coded in a fixed length code that, when present, indicates a fifth layer_id;
       a flag overlay_alpha_present_flag that, when set, indicates the presence of an integer overlay_alpha_layer_id coded in a fixed length code that, when present, indicates a sixth layer id of a layer containing an alpha map;
       an integer num_overlay_elements_minus1 coded in a variable length format indicative of a number of overlay element descriptions; and
       num_overlay_elements_minus1+1 overlay element descriptions,
           wherein each element description includes: an integer overlay_element_label_min and an integer overlay_element_label_max, indicative of a minimum or maximum, respectively, first sample value.

2. The method of claim 1, wherein the primary coded picture is enhanced by at least one spatial or SNR enhancement layer.

3. The method of claim 2, wherein the auxiliary coded picture includes a base layer and at least one spatial or SNR enhancement layer.

4. The method of claim 1, wherein the at least one primary picture layer and at least one associated auxiliary picture layer are in the same output layer set.

5. The method of claim 1, wherein the fourth layer id is equal to the second layer id, and the fifth layer_id is equal to the third layer_id.

6. The method of claim 1, further comprising: decoding the auxiliary coded picture.

7. The method of claim 6, further comprising: creating an output picture comprising at least one sample derived from at least one sample of the decoded auxiliary picture.

8. The method of claim 7, wherein the derivation involves calculating a weighted average between the spatially corresponding samples of the decoded primary picture and the decoded auxiliary picture, wherein the weighting factor is determined by an alpha map.

9. A non-transitory computer readable medium comprising a set of executable instructions to perform the method in claim 1.

10. A non-transitory computer readable medium comprising a set of executable instructions to perform the method in claim 2.

11. A non-transitory computer readable medium comprising a set of executable instructions to perform the method in claim 3.

12. A non-transitory computer readable medium comprising a set of executable instructions to perform the method in claim 4.

13. A non-transitory computer readable medium comprising a set of executable instructions to perform the method in claim 5.

14. A non-transitory computer readable medium comprising a set of executable instructions to perform the method in claim 6.

15. A non-transitory computer readable medium comprising a set of executable instructions to perform the method in claim 7.

16. A non-transitory computer readable medium comprising a set of executable instructions to perform the method in claim 8.

17. A system for video decoding comprising:
    a decoder (including a combination of hardware and software) configured to:
    receive a Video Parameter Set (VPS) pertaining to at least one coded video sequence and including layer descriptions for at least one primary picture layer having a first layer_id, and at least a first associated auxiliary picture layer having a second layer_id and a second associated auxiliary picture layer having a third layer_id;

receive an access unit belonging to one of the at least one coded video sequence, the access unit including: a primary coded picture including at least one Network Abstraction Layer (NAL-) unit having the first layer_id, a first auxiliary coded picture including at least one NAL unit having the second layer_id, a second auxiliary coded picture including at least one NAL unit having the third layer_id, and an overlay_info SEI message; and decode the primary coded picture;

wherein the overlay_info SEI message includes:

a flag overlay_info_persistence_flag that, when 0, indicates that the overlay_info SEI message applies only to the access unit;

an integer num_overlays_minus1 coded in a variable length format indicative of the number of overlay descriptions contained in the SEI message; and num_overlays_minus1+1 overlay descriptions;

wherein each overlay description includes:

an integer overlay_idx coded in a variable length format;

an integer overlay_content_layer_id coded in a fixed length format, indicative of a fourth layer id;

a flag overlay_layout_present_flag that, when set, indicates the presence of an integer overlay_layout_layer_id coded in a fixed length code that, when present, indicates a fifth layer_id;

a flag overlay_alpha_present_flag that, when set, indicates the presence of an integer overlay_alpha_layer_id coded in a fixed length code that, when present, indicates a sixth layer id of a layer containing an alpha map;

an integer num_overlay_elements_minus1 coded in a variable length format indicative of a number of overlay element descriptions; and num_overlay_elements_minus1+1 overlay element descriptions, wherein each element description includes: an integer overlay_element_label_min and an integer overlay_element_label_max, indicative of a minimum or maximum, respectively, first sample value.

18. The system of claim 17, wherein the primary coded picture is enhanced by at least one spatial or SNR enhancement layer.

19. The system of claim 18, wherein the auxiliary coded picture includes a base layer and at least one spatial or SNR enhancement layer.

20. The system of claim 17, wherein the at least one primary picture layer and at least one associated auxiliary picture layer are in the same output layer set.

21. The system of claim 17, wherein the fourth layer id is equal to the second layer id, and the fifth layer_id is equal to the third layer_id.

22. The system of claim 17, wherein the decoder is further configured to: decode the auxiliary coded picture.

23. The system of claim 22, wherein the decoder is further configured to: create an output picture comprising at least one sample derived from at least one sample of the decoded auxiliary picture.

24. The system of claim 23, wherein the derivation involves calculating a weighted average between the spatially corresponding samples of the decoded primary picture and the decoded auxiliary picture, wherein the weighting factor is determined by an alpha map.

* * * * *